United States Patent
Johnson

(10) Patent No.: US 10,025,079 B2
(45) Date of Patent: Jul. 17, 2018

(54) ACTINIC, SPOT-SCANNING MICROSCOPE FOR EUV MASK INSPECTION AND METROLOGY

(71) Applicant: Kenneth Carlisle Johnson, Santa Clara, CA (US)

(72) Inventor: Kenneth Carlisle Johnson, Santa Clara, CA (US)

( * ) Notice: Subject to any disclaimer, the term of this patent is extended or adjusted under 35 U.S.C. 154(b) by 148 days.

(21) Appl. No.: 15/269,848

(22) Filed: Sep. 19, 2016

(65) Prior Publication Data

US 2017/0090172 A1    Mar. 30, 2017

Related U.S. Application Data

(60) Provisional application No. 62/255,503, filed on Nov. 15, 2015, provisional application No. 62/233,853, filed on Sep. 28, 2015.

(51) Int. Cl.
*G02B 21/00* (2006.01)

(52) U.S. Cl.
CPC ....... *G02B 21/0016* (2013.01); *G02B 21/004* (2013.01); *G02B 21/008* (2013.01); *G02B 21/0032* (2013.01)

(58) Field of Classification Search
CPC ............ G02B 21/0016; G02B 21/0032; G02B 21/004; G02B 21/008
See application file for complete search history.

(56) References Cited

U.S. PATENT DOCUMENTS

| 2015/0077843 A1* | 3/2015 | Huhse ................ G02B 21/0032 359/380 |
| 2016/0161856 A1 | 6/2016 | Johnson |
| 2017/0184834 A1* | 6/2017 | Wolleschensky .... G02B 21/361 |

OTHER PUBLICATIONS

Garetto, A. et al. (2012). "Aerial imaging technology for photomask qualification: from a microscope to a metrology tool". Advanced Optical Technologies. 1(4), 289-298. DOI 10.1515/aot-2012-0124.
Naulleau, P. P. et al. (2014). "Electro-optical system for scanning microscopy of extreme ultraviolet masks with a high harmonic generation source". Optics Express, 22(17), 20144-20154. DOI 10.1364/OE.22.020144.

(Continued)

*Primary Examiner* — Huy T Nguyen

(57) ABSTRACT

An actinic, through-pellicle EUV mask inspection or metrology system acquires image information by scanning an array of focused illumination spots across a photomask and detecting the mask reflectance signal from each spot in synchronization with the scan motion. The radiation from each spot is detected by a detector comprising four quadrant sensors to provide information on the angular reflectance distribution, which is sensitive to the reflectance phase. The focal spots are generated from achromatic EUV microlenses (phase-Fresnel, Schupmann doublets), enabling the use of a high-bandwidth, high-power, laser-produced-plasma EUV source for high-throughput operation. The microlens foci are projected through illumination optics (EUV mirrors) onto the focal spots at the mask, and the microlenses nullify the illumination optics' geometric aberrations for substantially aberration-free point imaging. Aberration-correcting micro-optics may also be used for the collection optics between the mask and the detector array.

7 Claims, 6 Drawing Sheets

(56) References Cited

OTHER PUBLICATIONS

Goldberg, K, A. et al. (Sep. 2013). "The SEMATECH high-NA actinic reticle review project (SHARP) EUV mask-imaging microscope". In SPIE Photomask Technology (pp. 88800T-88800T). International Society for Optics and Photonics. DOI 10.1117/12.2026496.

Wang, Y. G. et al. (Oct. 2014). "Phase-enhanced defect sensitivity for EUV mask inspection". In SPIE Photomask Technology (pp. 92350L-92350L). International Society for Optics and Photonics. DOI 10.1117/12.2069291.

Zhang, B. et al. (Apr. 2014). "Quantitative tabletop coherent diffraction imaging microscope for EUV lithography mask inspection". In SPIE Advanced Lithography (pp. 90501D-90501D). International Society for Optics and Photonics. DOI 10.1117/12.2046526.

Furhapter, S. et al. (2005). "Spiral phase contrast imaging in microscopy". Optics Express, 13(3), 689-694. DOI: 10.1364/OPEX.13.000689.

"Lens Design Fundamentals" by Rudolf Kingslake, 1978, Academic Press Inc., p. 321-322.

\* cited by examiner

ACTINIC, SPOT-SCANNING MICROSCOPE FOR EUV MASK INSPECTION AND METROLOGY

CROSS-REFERENCE TO RELATED APPLICATION(S)

This application claims the benefit under 35 U.S.C. § 119(e) of the following two applications, both of which name Kenneth C. Johnson as the inventor, and both of which are incorporated by reference in their entirety for all purposes:

U.S. Patent Application No. 62/233,853, filed Sep. 28, 2015 for "Actinic, Spot-Scanning EUV Mask Inspection System;" and U.S. Patent Application No. 62/255,503, filed Nov. 15, 2015 for "Actinic, Spot-Scanning EUV Mask Inspection System".

The substance of these applications has been published in the following corresponding papers posted on the vixra.org e-print archive:

"Actinic, Spot-Scanning EUV Mask Inspection System", http://vixra.org/abs/1509.0287, Sep. 30, 2015: corresponds to 62/233,853.

"Zero-Aberration, Actinic, EUV Mask Inspection Microscope with High Defect Sensitivity", http://vixra.org/abs/1511.0139, Nov. 16, 2015 [v1] and Jan. 25, 2016 [v2], corresponds to 62/255,503.

BACKGROUND OF THE INVENTION

Extreme ultraviolet (EUV) lithography systems use an operating wavelength of 13.5 nm to project pattern information from an EUV-reflective photomask onto a semiconductor wafer at reduced magnification. The stringent quality standards required for EUV photomasks can be achieved with actinic mask inspection and metrology tools, which use the same 13.5-nm wavelength for microscopy. Compared to DUV (193-nm deep ultraviolet) or e-beam imaging, an actinic system is more sensitive to mask characteristics that impact EUV lithography performance. Also, an actinic system can view the mask through a protective pellicle (cover plate), which is transparent to EUV but not to DUV or e-beam.

One such actinic inspection system is the EUV Aerial Image Measurement System (AIMS) made by Carl Zeiss, Inc. [Ref. 1]. This is a full-field imaging microscope, which uses illumination and projection optics similar to EUV lithography systems but operating at a lower numerical aperture. The need for wide-field, diffraction-limited imaging and high throughput makes the AIMS a very expensive system.

The Center for X-ray Optics (CXRO) at Lawrence Berkeley National Laboratory, and Samsung Electronics Co., Ltd., have demonstrated a relatively simple and low-cost EUV mask metrology system, which scans a single, diffraction-limited EUV focal spot across the mask while the mask reflectance signal is recorded [Ref 2]. The system uses a tabletop, high-harmonic-generation (HHG) EUV source and a Fresnel zoneplate focusing optic. But with a single scanning point and very low source power, the system is too slow for commercial photomask qualification.

CXRO has also developed a higher-end EUV microscopy tool, the "Semiconductor High-NA Actinic Reticle Review Project" (SHARP). [Ref 3] It is a low-throughput research system using a synchrotron EUV source, which would be impractical for commercial use.

U.S. Pat. No. 9,188,874 ("Spot-Array Imaging System for Maskless Lithography and Parallel Confocal Microscopy", hereafter the '874 patent) and U.S. Pat. No. 9,097,983 ("Scanned-Spot-Array EUV Lithography System", hereafter the '983 patent), and other prior art cited therein, disclose massively-parallel spot-scanning systems that overcome the throughput limitations of single-spot scanners such as the CXRO/Samsung system. The EUV focusing elements can be achromatic phase-Fresnel microlenses (Schupmann doublets), which allow the use of a laser-produced plasma (LPP) EUV source. (An LPP source has much more power than HHG sources and is much less costly than synchrotron sources, but its wide spectral bandwidth necessitates achromatic focusing lenses.) The microlenses can be constructed to offset and nullify geometric aberrations in the illumination optics, so the optical system could be simpler and less costly than an AIMS-type system.

The prior-art microscopy systems outlined above typically produce reflectance amplitude images of an inspection surface, but provide little or no information on image phase. Techniques such as Zernike phase-contrast microscopy can be used to provide phase sensitivity, but at the expense of reduced amplitude sensitivity. [Ref. 4] An alternative imaging technique, Coherent Diffraction Imaging (CDI), can simultaneously determine reflectance amplitude and phase by measuring the inspection surface's far-field, angular reflectance distribution as the sample is translated across the illumination beam. [Ref. 5] This is a "lensless" imaging technique, which can produce diffraction-limited images without projection optics. But CDI has several limitations: It requires a highly coherent EUV source such as a synchrotron or HHG source. Complex numerical algorithms are required to compute the image from the measured angular reflectance distribution. For EUV mask inspection, defect sensitivity may be limited because only a small portion of the detector signal originates from the defect area.

SUMMARY OF THE INVENTION

The advantages of the various prior-art EUV microscopy systems outlined above can be combined, and their disadvantages circumvented, by adapting the apparatus of the '874 and '983 patent apparatus to detect the angular reflectance distribution from each focal spot. Rather than using a single sensor element per spot, a sub-array of sensor elements is used to sense the directional reflectance distribution from each spot. A large sub-array is not required, e.g. a detector comprising four quadrant sensor elements can suffice to provide detection sensitivity to reflectance phase as well as amplitude.

The invention broadly incorporates some elements and processes similar to prior-art systems such as the '874 patent. Illumination optics focus each of a plurality of discrete radiation beams onto a corresponding focal spot on or proximate an inspection surface. (The focal spots may be diffraction-limited.) The radiation beams transmit through, or reflect from, the inspection surface, and are then conveyed by collection optics to an array of optical detectors, each of which senses radiation from a corresponding radiation beam. There may be some overlap between radiation beams on the detectors, but most (over half) of the radiation intercepting each detector is from a particular corresponding radiation beam. A scanning mechanism establishes relative motion between the focal spots and the inspection surface (e.g. by scanning the surface) so that the paths traversed by the focal spots relative to the inspection surface comprise a set of scan lines on the surface. (The lines can be straight or possibly curved.) The detectors sense the radiation in synchronization with the scan motion to synthesize a high-resolution raster image of the inspection surface, or to optically measure characteristics of the inspection surface.

In an improvement over the prior art, each detector comprises a sub-array (plurality) of optical sensor elements, which sense different portions of the corresponding radiation beam's angular radiance distribution after interacting with the inspection sample. (The "detector" may comprise a subset of a larger, contiguous array of sensor elements such as a CCD pixel array.) The additional information provided by using multiple sensor elements per focal spot enables simultaneous detection of image phase and amplitude, and may provide additional benefits such as improved spatial imaging resolution or measurement accuracy.

This improvement can be applied to any of the '874 patent's microscopy embodiments (e.g. as recited in '874 claim 30). Microscopes employing modified pupil phase functions, such as Zernike phase microscopes [Ref 4] or spiral-phase microscopes [Ref. 6], could also benefit from detection of the angular radiance distribution. A linear discontinuity in the pupil phase function, such as that illustrated in FIGS. 33 and 34 of U.S. Patent Application 2016/0161856 A1, could enhance imaging edge contrast, and could be augmented with angular radiance detection to further enhance edge resolution.

For actinic inspection and metrology of EUV photomasks, it is advantageous to use an LPP to provide EUV radiation. The LPP-produced radiation is partitioned into individual radiation beams by achromatic phase-Fresnel microlenses of the type disclosed in the '983 patent (e.g. see '983 FIG. 10). The radiation beams are conveyed to the inspection surface by illumination optics (EUV imaging mirrors), and the microlenses are configured to offset and nullify geometric aberrations in the illumination optics so that each radiation beam is focused to a diffraction-limited spot on or proximate the inspection surface with substantially zero geometric aberration. The EUV radiation reflected by the photomask is conveyed via collection optics (EUV imaging mirrors) to the detector array (each detector comprising a sensor sub-array), and beam-forming micro-optics may be used in the vicinity of the detectors to neutralize geometric aberrations in the collection optics and improve resolution of the angular radiance distribution by each sensor sub-array.

The system can provide high sensitivity to mask defects by focusing a radiation beam to a diffraction-limited spot intercepting the defect. Phase defects, in particular, can be reliably detected with quadrant sensors. As a result of the high illumination numerical aperture and small spot size, e.g., in relation to prior-art CDI systems, higher spatial frequencies are detectable and image resolution is improved. Also, due to the small spot size there is not much structure in the reflected beam's angular radiance distribution and comparatively few sensor elements are needed to extract the useful reflectance information from each spot. This greatly simplifies the conversion of detector signal data to image information.

A small focal spot would result in very slow operation with prior-art CDI-type systems, but the invention uses a large number (e.g. thousands) of concurrently-scanning spots to achieve high imaging throughput. The achromatic microlenses in the illumination system enable use of a broadband LPP EUV source, which provides sufficient power for high-throughput operation but is economical for commercial applications. In addition, aberration-correcting micro-optics can enable the use of comparatively simple and economical EUV imaging optics in both the illumination and collection optics.

DESCRIPTION OF SPECIFIC EMBODIMENTS

Phase Defect Detection

Consider a prior-art, full-field-illumination microscope such as the AIMS, which detects small defects on an unpatterned (blank) background. The electromagnetic field's complex amplitude on a particular detector is normalized to 1 for a blank image (no defect), resulting in unit field intensity, $I=1$. In the presence of a small defect below the optical resolution limit, the amplitude is perturbed by a small increment a, resulting in a field intensity of $$I=|1+a|^2=1+2Re[a]+|a|^2$$

The $|a|^2$ term is typically below the detection threshold, leaving the $Re[a]$ term as the only indicator of the defect's presence. Defect visibility is good for a pure-amplitude defect (i.e., real-valued a), but a pure-phase defect (pure-imaginary a) is invisible to the microscope.

The defect-scattered light is concentrated mainly in the field's high spatial frequencies, which can be phase-shifted relative to low frequencies to enhance defect visibility. The phase shift can be effected either by designing an annular phase retarder into the system pupil (by the method of Zernike phase-contrast microscopy), or by defocusing the image. For example, if a $\pi/2$ phase shift (i.e. a factor of $e^{i\pi/2}=i$) is applied to the defect amplitude a, then the resulting field intensity becomes $$I=|1+ia|^2=1-2Im[a]+|a|^2$$

In this case, the system exhibits high sensitivity to a pure-phase defect, but is insensitive to a pure-amplitude defect. For any particular complex amplitude a, the phase shift can be selected to provide optimum defect sensitivity; but it is not possible to choose the phase shift to provide good sensitivity for all defects. Thus, multiple images would need to be acquired with different phase shifters, or different focus offsets, to ensure visibility of all detectable defects.

Figure 1A:
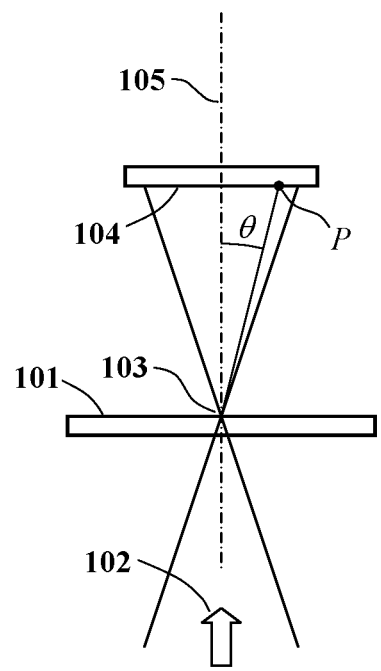
FIGS. 1A and 1B show a simplified spot-scanning microscope schematic, illustrating the spatial intensity profile across a detector in the presence of a defect on an inspection surface.

A spot-scanning microscope, by contrast, can be adapted to exhibit good sensitivity for both phase and amplitude defects simultaneously by detecting the far-field angular radiance distribution from each focused illumination spot. FIG. 1A shows a (greatly simplified) conceptual schematic of the system. For clarity of illustration the inspection surface 101 (photomask) is represented as a transmission element. (It can alternatively be a reflection element.) Illumination 102 is focused onto a diffraction-limited spot at point 103 on the surface, and the transmitted radiation is sensed by a detector 104 covering the transmitted beam's full angular range. (Each point P on the detector receives radiation directed at a corresponding ray angle θ from the beam axis 105 through point 103 in FIG. 1A, and the irradiance at point P is proportional to the transmitted beam's radiance in the direction of angle θ.) A single detector element integrating over the full angular range would be sensitive to pure-amplitude defects, but insensitive to pure-phase defects, as described above. However, a pure-phase defect will induce an imbalance in the intensity distribution across the detector surface, which can be sensed by partitioning the detector into multiple sensor elements.

Figure 1B:
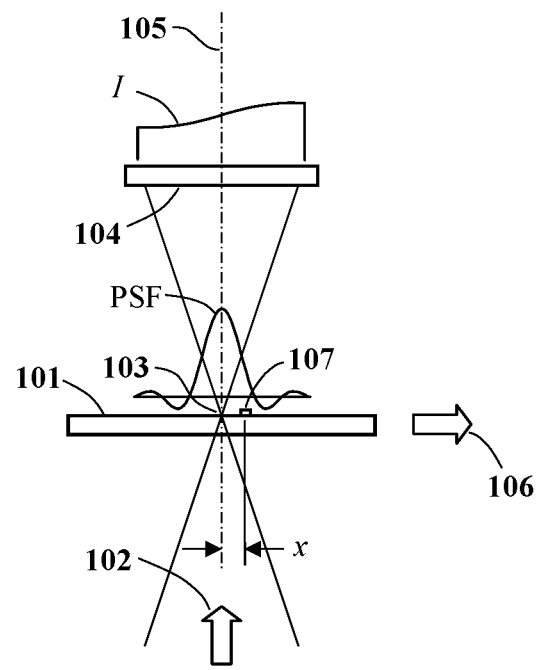

FIG. 1B illustrates the spot-scanning process. The illumination spot, illustrated schematically by point 103 in FIG. 1A, is not actually a geometric point. It is characterized by an amplitude point-spread function (PSF) defined by the illumination optics' optical resolution limit. (Point 103 is the PSF centroid.) The PSF remains stationary as the inspection surface 101 is scanned across the spot. (The scan direction is indicated as 106.) As the surface is scanned, a small defect 107 on the surface affects the optical intensity profile across the detector (indicated as curve I). The intensity varies dynamically as a function of the defect's coordinate position x along the scan direction.

Figure 2A:
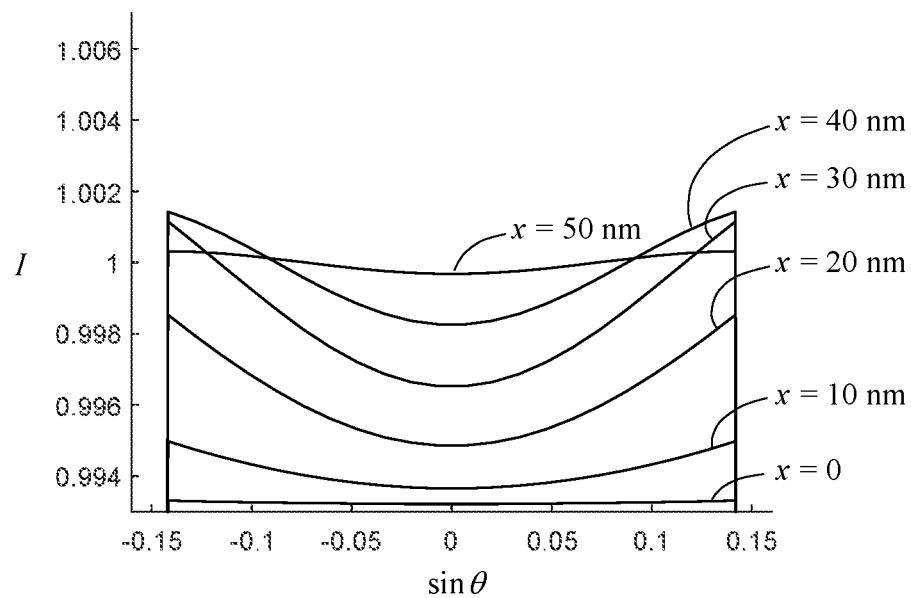
FIGS. 2A and 2B illustrated the detector intensity profile calculated for a small, isolated defect on an inspection surface at various defect positions, for a pure amplitude defect (FIG. 2A) and a pure phase defect (FIG. 2B).
Figure 2B:
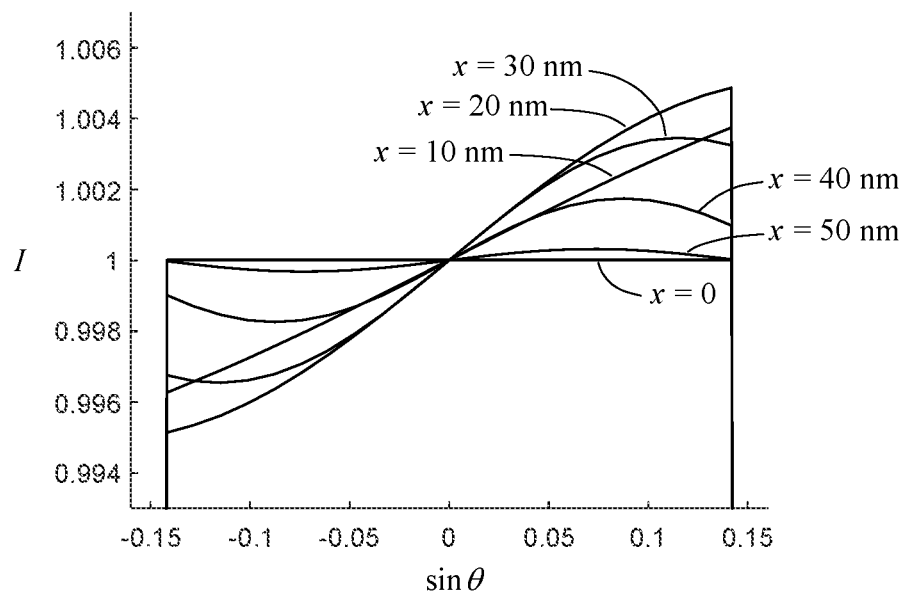

A numerical example, based on a Fourier-optics simulation, illustrates the types of signal patterns that can be obtained from a small, isolated defect on the inspection surface. (Similar detection sensitivity can be obtained on complex pattern defects.) The illumination 102 is a focused, coherent beam of wavelength 13.5 nm (EUV) and numerical aperture (NA) of 0.16. The defect is a disk of diameter 10 nm, within which the surface transmittance is 1+a (relative to a defect-free background transmittance of 1). Two cases will be considered: a=−0.1 (pure amplitude) and a=0.1i (pure phase). The defect is scanned across the beam axis 105. The complex field amplitude across the detector is approximated as the Fourier transform of the transmitted field amplitude at the inspection surface, which is realistic approximation when the surface-to-detector distance is much larger than the focal spot. FIG. 2A illustrates calculated cross-sectional intensity profiles over the detector in the plane of FIG. 1B at several defect positions x, for case 1 (a=−0.1), and FIG. 2B shows similar profiles for case 2 (a=0.1i). The horizontal axis coordinate (sin θ) in FIGS. 2A and 2B is related to the ray angle θ in FIG. 1A.

Figure 3:
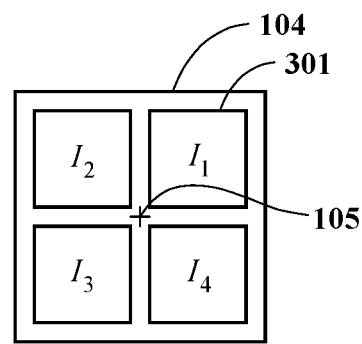
FIG. 3 illustrates a detector comprising four quadrant sensors, which can detect the signal asymmetries of the type illustrated in FIG. 2B.

A full area-integrating detector can sense the signal variations illustrated in FIG. 2A, but a partitioned detector can also detect changes in the intensity distribution as shown in FIG. 2B. As illustrated in FIG. 3, for example, the detector 104 can comprise four quadrant sensors (such as sensor 301) surrounding the beam axis 105. The area-integrated sensor signals over the four separate quadrants are indicated as $I_1$, $I_2$, $I_3$, and $I_4$, and the following derived signals are determined from these quantities (either digitally or via analog electronics):

$$I_{sum}=I_1+I_2+I_3+I_4$$

$$I_x=I_1-I_2-I_3+I_4$$

$$I_y=I_1+I_2-I_3-I_4$$

Figure 4A:
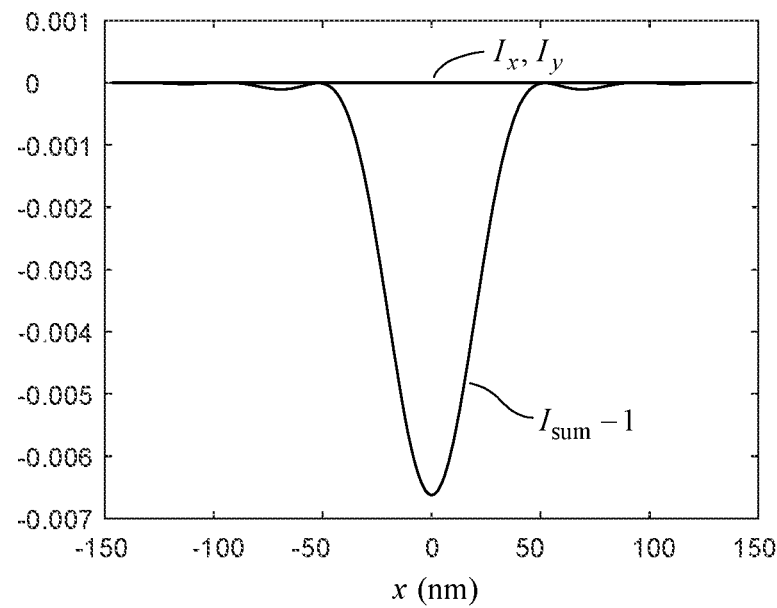
FIGS. 4A and 4B illustrate signals derived from a quadrant sensor array, as a function of defect position, for a pure amplitude defect (FIG. 4A) and for a pure phase defect (FIG. 4B).
Figure 4B:
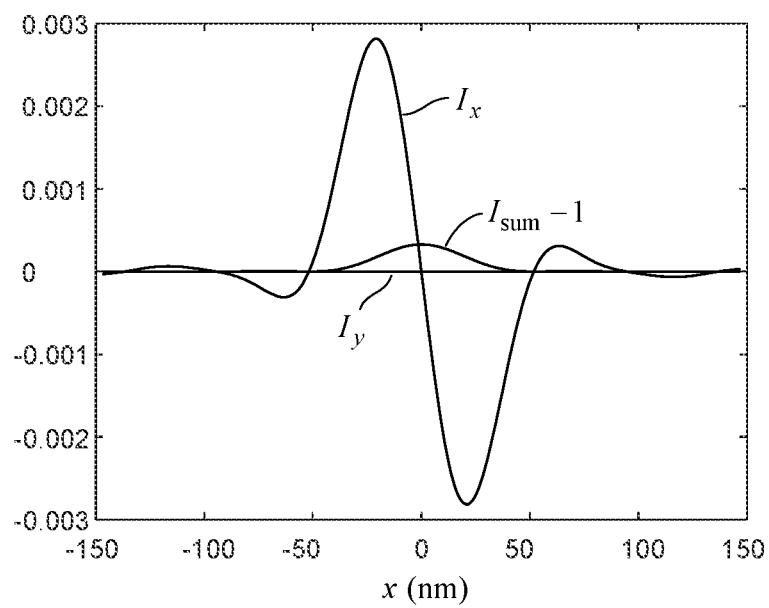

$I_{sum}$ is the total integrated signal. $I_x$ and $I_y$ are components of a vector representing the intensity gradient over the detector. For a defect-free inspection surface, $I_{sum}=1$, $I_x=0$, and $I_y=0$ over the full x scan. FIGS. 4A and 4B show plots of $I_{sum}-1$, $I_x$, and $I_y$ for the two cases described above: a=−0.1 in FIG. 4A and a=0.1i in FIG. 4B. The combination of $I_{sum}$, $I_x$ and $I_y$ scans provides robust detection capability for both pure-amplitude and pure-phase defects (or any combination of phase and amplitude).

Figure 5:
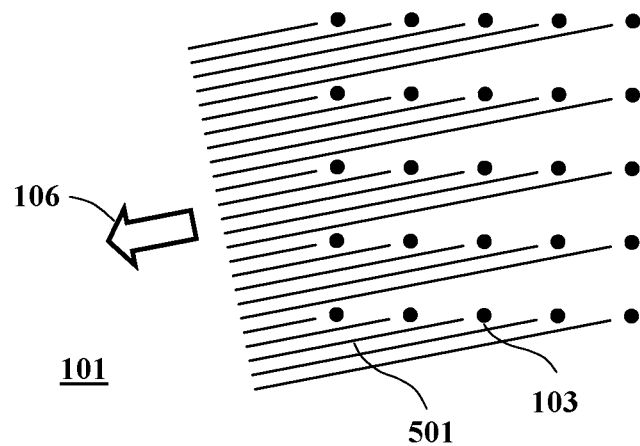
FIG. 5 illustrates a spot-array scan pattern on an inspection surface.

$I_y$ is identically zero in FIGS. 4A and 4B. The plots represent a single line scan with the defect 107 traversing the beam axis 105 (FIG. 1B), but with a full, two-dimensional raster scan $I_x$ and $I_y$ will both provide useful information on phase defects. As illustrated in FIG. 5, the inspection surface 101 can be continuously scanned (in direction 106) across a large array of illuminated focal spots (e.g. spot 103) to cover a large area with multiple interleaved line scans (e.g. line 501) in a raster pattern. For metrology applications, the raster pattern might include very few scan lines to measure dimensional features traversed by the lines. (Or a single scan line might be covered by multiple focal spots, e.g., at different focus offsets.)

System Schematic

Figures 6A, 6B:
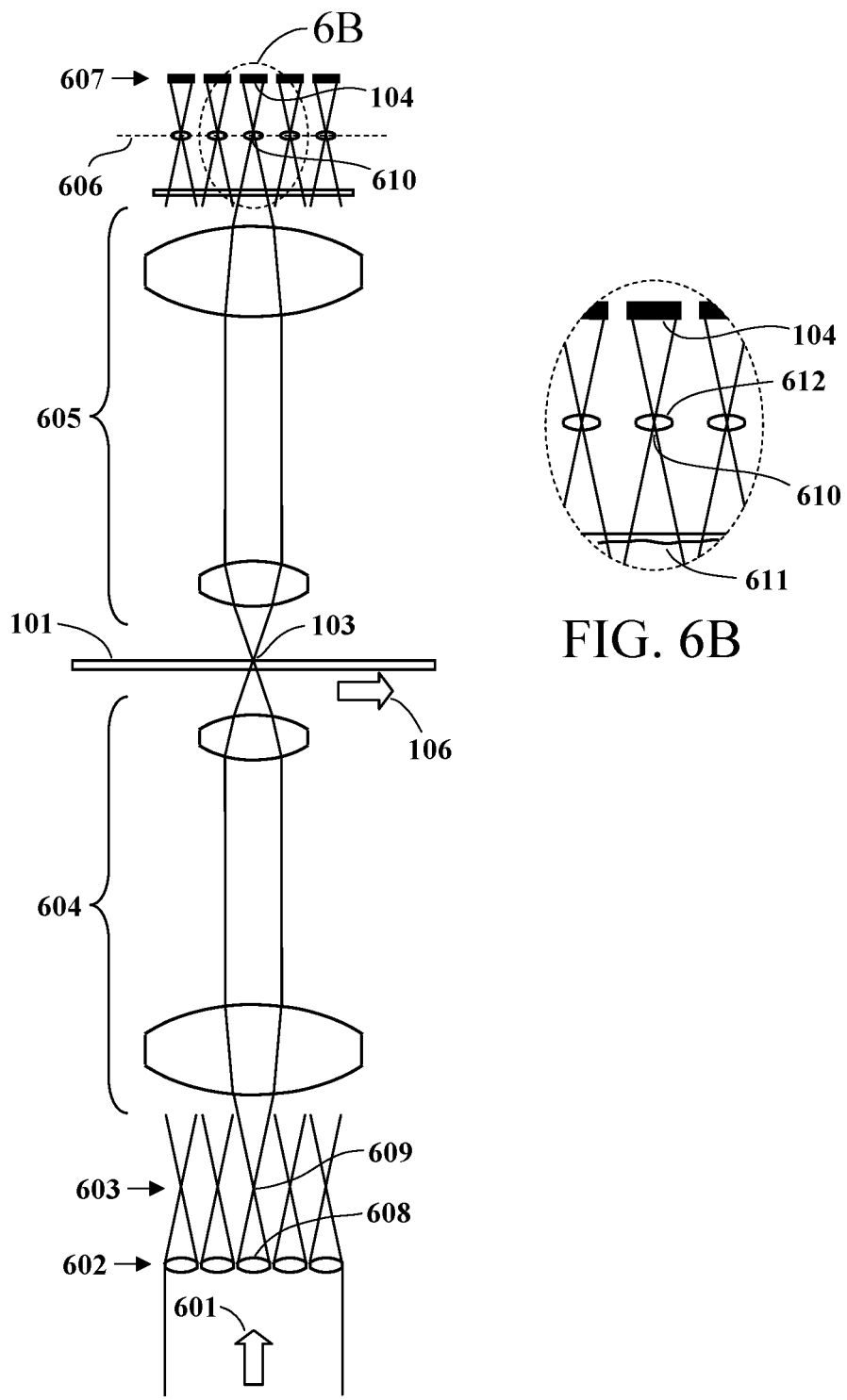
FIGS. 6A and 6B show a spot-scanning microscope schematic, illustrating optics for illuminating and collecting radiation from multiple focused radiation spots on an inspection surface.

The system concept illustrated in FIGS. 1A and 1B is over-simplified, but FIG. 6A shows a more realistic schematic of a spot-scanning transmission microscope. Illumination 601 is directed through spot-generation optics comprising a microlens array 602, which separates the illumination into discrete, point-divergent radiation beams 603. Alternative embodiments would not necessarily use a microlens array for beam partitioning. For example, an array of light-emitting diodes or optical fibers could be used to generate point-divergent radiation beams. The beams are focused by illumination optics 604 onto an inspection surface 101, are refocused by collection optics 605 onto conjugate plane 606, and are intercepted by detector array 607. (The illumination and collection optics are illustrated schematically as lens systems, although they could alternatively comprise mirrors.) For example, one particular radiation beam is focused by microlens 608 through point 609 (or alternatively, the beam may be generated by a light-emitting diode or optical fiber at point 609); it is focused to a diffraction-limited focal spot at point 103 on surface 101, is then focused to point 610 on conjugate plane 606, and is intercepted by detector 104.

The detectors can be sufficiently close to the conjugate plane 606 that the individual radiation beams are substantially non-overlapping on the detector array, each detector intercepting one corresponding radiation beam. (If there is significant overlap between radiation beams on the detectors, a ptychography-type calculation [Ref 5] can be used to separate the individual beam signals. But the image calculation will generally be simpler and faster if there is substantially no beam overlap on the detectors.) The detector array is not right at the conjugate plane; it is displaced some distance from the conjugate plane (either in front of or behind the plane) to provide adequate resolution of each beam's angular radiance distribution. Each detector such as element 104 comprises a sub-array of sensor elements, such as the quadrant sensor array illustrated in FIG. 3, to sense the transmitted angular radiance distribution through surface 101. The detectors sense the radiation as the inspection surface is scanned to synthesize a high-resolution raster image of the inspection surface, or to optically measure characteristics of the inspection surface.

The collection optics may include a couple of optional mechanisms illustrated in the enlarged detail view in FIG. 6B. An aberration corrector 611 such as a phase plate of nonuniform thickness can correct aberrations in the collection optics. The collection optics do not need to have good point-imaging performance, but the corrector can operate to provide uniform, caustic-free illumination over the detectors, and can help to preserve the symmetry properties of the intensity profiles illustrated in FIGS. 2A and 2B. (Odd-parity aberrations such as coma could distort the profiles asymmetrically and change the intensity balance between quadrant sensors.) It may also be advantageous to use a small field lens 612 at the beam focus to image the system pupil onto the detector 104.

EUV Mask Inspection/Metrology System

For EUV mask inspection or metrology, the inspection surface (mask) and large-scale lens elements in FIG. 6A would be replaced by reflective elements. The micro-optics (e.g., microlens 608 and optional aberration corrector 611 and field lens 612) can be EUV-transmitting elements such as phase-Fresnel molybdenum structures formed on thin silicon substrates. The illumination and collection optics could be similar to EUV lithography scanners, but with two significant simplifications: First, the NA would be much lower, e.g. 0.16 or lower at the mask, versus a lithography scanner's typical NA of 0.33 at the wafer. Second, the micro-optics' aberration-correcting capability could significantly simplify the illumination optics design.

Figure 7:
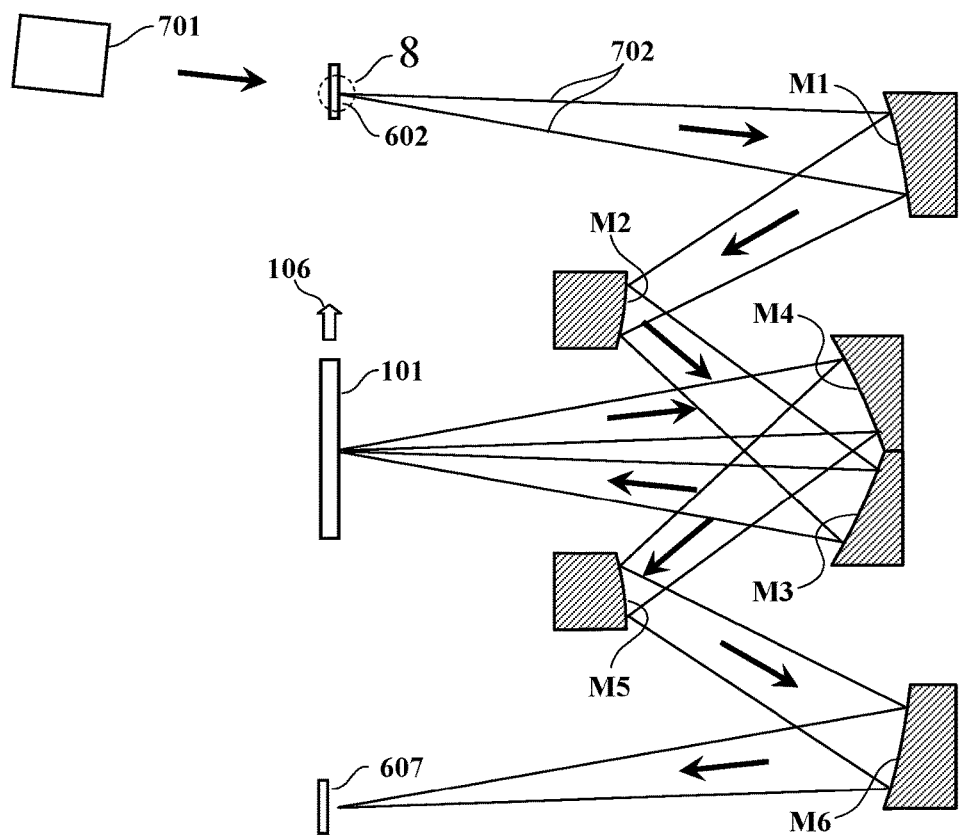
FIG. 7 shows an EUV embodiment of the spot-scanning microscope.

A possible EUV system configuration is illustrated in FIG. 7. EUV illumination from an EUV source 701 such as the Adlyte LPP system [Ref. 7] is directed through spot-generation optics comprising an EUV microlens array 602, which separates the illumination into discrete radiation beams. (The figure shows edge rays 702 from one particular beam.) Illumination optics comprising EUV mirrors M1, M2 and M3 (e.g., near-normal-incidence mirrors with multilayer Mo/Si reflectance films) focus the beams onto corresponding diffraction-limited focal spots on an inspection surface 101 (a reflective EUV mask). The illumination optics in this embodiment are a 3-mirror Offner catoptric system [Ref 8]. The collection optics, which are also an Offner 3-mirror system comprising mirrors M4, M5 and M6 in this embodiment, image the inspection surface onto a conjugate plane, which is proximate a detector array 607 such as an EUV CCD camera. Each detector comprises a sub-array of sensor elements as described previously (FIG. 3). Optional micro-optic elements such as elements 611 and 612 in FIG. 6 (not shown in FIG. 7) may be used for aberration control or pupil imaging. The mask is mechanically scanned across the focal spot array in synchronization with the detection to synthesize a high-resolution EUV raster image of the mask surface, or to optically measure characteristics of the mask. (The scan motion is indicated by direction arrow 106, and a possible scan pattern, showing raster lines traced by individual focal spots on the mask, is illustrated in FIG. 5.)

Achromatic EUV Microlenses

The Offner illumination optics can have intrinsically low, but significant, geometric optical aberrations. The point-imaging aberrations can be substantially eliminated by designing each spot-generation microlens to produce a spherical, point-convergent wavefront at the corresponding focal spot on the mask surface. (The illumination optics' aberrations are taken into account in the microlens design.) A single microlens element can be designed to produce an aberration-free focal spot (diffraction-limited but with zero geometric aberration) at one wavelength, but would exhibit chromatic aberration over the 2% wavelength band of an LPP source. However, two microlens elements in series, in the form of a Schupmann doublet as described in the '983 patent, can simultaneously correct aberrations at two distinct wavelengths. This is adequate to achieve substantially achromatic performance for an LPP source if the microlens focal lengths are sufficiently short.

Figure 8:
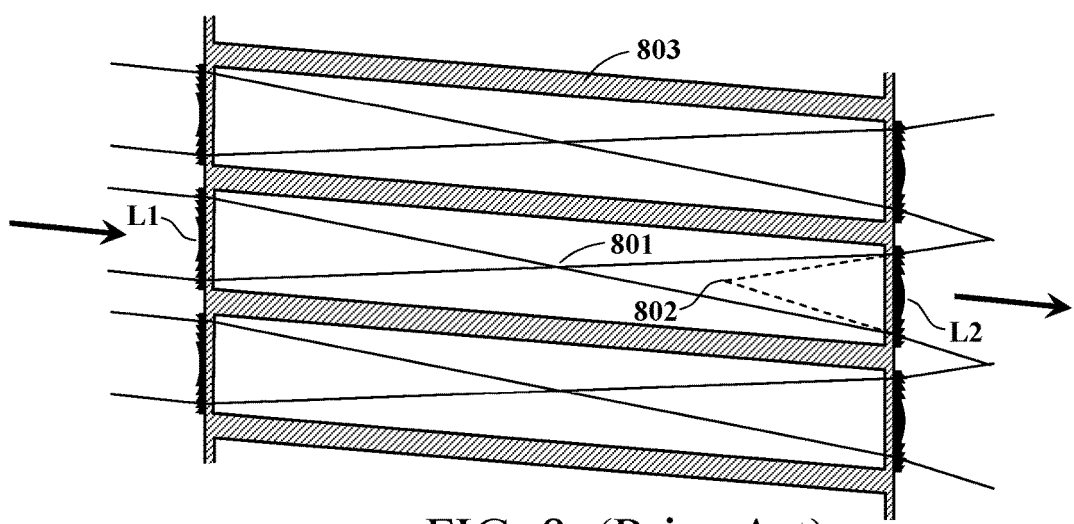
FIG. 8 shows a cross-sectional schematic of an achromatic EUV microlens array, which can be used in the FIG. 7 system.

FIG. 8 illustrates an expanded cross section of the microlens array 602 in FIG. 7, showing the structure of the Schupmann doublets (cf. FIG. 10 in the '983 patent). Three doublets and corresponding edge rays are illustrated. One illustrative doublet lens comprises a positive-power (converging) element L1 followed by a negative-power (diverging) element L2, with an intermediate lens focus 801 formed between the two elements. The doublet produces a discrete radiation beam, which diverges from a virtual focus 802 behind L2 and is focused by the illumination optics to a diffraction-limited focal spot on the inspection surface. (The virtual focus 802 is intentionally aberrated to nullify geometric aberration in the illumination optics.)

L1 and L2 can be phase-Fresnel molybdenum structures formed on thin silicon substrates, which are supported on opposite sides of a hollow microchannel plate 803. (The converging element L1 is concave, and the diverging element L2 is convex, because the refractive index of molybdenum is less than 1 at EUV wavelengths.) The substrates can be thinner than EUV pellicles because structural support is provided by the microchannel plate. The phase-Fresnel form can be approximated by a multilevel staircase profile, as illustrated by profile 503 in FIG. 5 of the '983 patent, to facilitate fabrication using multilevel deposition and etch methods. (Fabrication methods used for phase-shift EUV masks can be adapted for microlens fabrication.)

In a specific exemplary design, typical dimensions for L1 and L2 would be 20-micron lens diameter and 1-mm microchannel thickness. This results in 0.04-NA beam divergence at the virtual foci, and with 4× demagnification the NA at the inspection surface would be 0.16. Each lens would have eight Fresnel facets, with each facet comprising four or eight staircase levels. The minimum facet width is 0.7 micron, and the facet heights are 0.18 micron. Depth tolerances would be comparatively loose in relation to EUV mask layers because transmission optics are generally less sensitive to surface profile errors than reflective optics (especially with the very low refractive index contrast of EUV optical materials such as molybdenum). With 4× demagnification, lateral tolerances on the phase-Fresnel structures would be expected to be about 4 times looser than EUV photomasks (although tighter dimensional control may be required for metrology applications).

The doublet's EUV transmission efficiency at wavelength 13.5 nm is approximately 36% neglecting substrate losses and microchannel fill-factor losses.

System Design and Performance Parameters

Many system design embodiments other than the FIG. 7 configuration are possible, but some system design and performance parameters can be estimated or bounded based only on general physical constraints, without reference to an actual optical design. One such constraint is the diffraction limit. If the LPP were an ideal point source the focal spots would have the form of Airy disks (assuming a circular illumination pupil). The first Airy ring has a radius of $0.61\lambda/NA$, where $\lambda$ is the wavelength and NA is the numerical aperture of the focused beam. (For example, with $\lambda=13.5$ nm and NA=0.16 the spot radius would be approximately 50 nm at the first nodal ring.) The geometric image size of the actual LPP source at each focal spot should be comparable to or smaller than this dimension to avoid significant loss of image resolution. Based on this condition, the source characteristics determine the approximate minimum number of focal spots and associated microlenses and detectors.

In general, the geometric etendue [Ref. 9] of each focal spot (as determined by the LPP source size) should be of order $\lambda^2$ or less to preserve diffraction-limited imaging, and the collected LPP source etendue divided by this value provides an estimate of the minimum required number of microlenses. The Adlyte LPP source radius is at least 25 microns, and the collection solid angle is approximately 0.2 steradian. (The angle can be higher, but at considerably increased cost.) This implies a collected source etendue of $\pi(25 \text{ μm})^2(0.2 \text{ Sr})$, and dividing this number by $\lambda^2$ (with $\lambda=13.5\times10^{-3}$ μm) yields the estimated number of microlenses and associated detectors: $2\cdot10^6$. (With four quadrant sensors per detector, the total number of sensors would be $8\cdot10^6$.) Due to the sparse illumination pattern the required number of detectors is much less than what would be needed for conventional microscopy with full-field illumination. On the other hand, the EUV power and data readout rate per detector are much higher.

Assume a mask illumination field of 50 mm² for inspection. With 4×-reduction illumination optics, the approximate microlens diameter is $4\sqrt{50\text{mm}^2/(2\cdot10^6)}=20$ μm. Using 4×-magnification collection optics between the mask and detector array, the detector size would also be of order 20 μm (or 10 μm per quadrant).

Further assuming a raster step size of 10 nm, the number of image frames required to cover a $(141 \text{ mm})^2$ mask area with $2\cdot10^6$ focal spots would be $$(141 \text{ mm})^2/(10\cdot10^{-6} \text{ mm})^2/(2\cdot10^6)=10^8.$$

The Adlyte source repetition rate is 10 kHz (although it could possibly be increased to 20 kHz), implying a mask scan time of $10^8/(10^4 \text{ sec}^-)=10^4$ sec (i.e., approximately 3 hours). The detector frame rate is assumed to be matched to the 10 kHz source repetition rate.

The Adlyte source brightness is 1000 W/(mm²Sr) at intermediate focus. Assuming 1% radiance transmittance from the intermediate focus to the detector, the brightness at the detector would be 10 W/(mm²Sr). This value is multiplied by the geometric etendue per spot spot, $\lambda^2$, to get the approximate detector power per spot:

$$(10 \text{ W/(mm}^2\text{Sr}))((13.5\cdot10^{-6} \text{ mm})^2\text{Sr})=1.8\cdot10^{-9} \text{ W.}$$

At the 10 kHz pulse repetition rate the detector-collected energy per focal spot per pulse is $$((1.8\cdot10^{-9} \text{ J/sec})/(10^4 \text{ sec}^{-1}))(6.24\cdot10^{18} \text{ eV/J})=1.1\cdot10^6 \text{ eV.}$$

At 92 eV per EUV photon (for a 13.5-nm wavelength), this equates to 12,000 photons. With quadrant sensors, the photon count would be 3000 per quadrant. By comparison, the required number of photons reported in the literature is 1400 for 22- and 16-nm lithography nodes [Ref. 10].

The numerical values in the above analysis are only exemplary, but similar reasoning can be used to estimate system design and performance parameters under other assumptions.

REFERENCES

The following additional patent and literature references are referred to in this disclosure and are incorporated by reference:

| U.S. Pat. No. 9,097,983 | issued August 2015 | Johnson |
| U.S. Pat. No. 9,188,874 | issued November 2015 | Johnson |
| U.S. Patent App. 2016/0161856 A1 | published June 2016 | Johnson |

Ref 1: Garetto, A., Scherübl, T., & Peters, J. H. (2012). Aerial imaging technology for photomask qualification: from a microscope to a metrology tool. *Advanced Optical Technologies*, 1(4), 289-298. DOI 10.1515/aot-2012-0124

Ref 2: Naulleau, P. P., Anderson, C. N., Anderson, E. H., Andreson, N., Chao, W., Choi, C., . . . & Miyakawa, R. (2014). Electro-optical system for scanning microscopy of extreme ultraviolet masks with a high harmonic generation source. *Optics Express*, 22(17), 20144-20154. DOI 10.1364/OE.22.020144

Ref 3: Goldberg, K. A., Mochi, I., Benk, M. P., Lin, C., Allezy, A., Dickinson, M., . . . & Salmassi, F. (2013, September). The SEMATECH high-NA actinic reticle review project (SHARP) EUV mask-imaging microscope. In *SPIE Photomask Technology* (pp. 88800T-88800T). International Society for Optics and Photonics. DOI 10.1117/12.2026496

Ref 4: Wang, Y. G., Miyakawa, R., Chao, W., Goldberg, K., Neureuther, A., & Naulleau, P. (2014, October). Phase-enhanced defect sensitivity for EUV mask inspection. In *SPIE Photomask Technology* (pp. 92350L-92350L). International Society for Optics and Photonics. DOI 10.1117/12.2069291

Ref 5: Zhang, B., Adams, D. E., Seaberg, M. D., Gardner, D. F., Shanblatt, E. R., Kapteyn, H., & Murnane, M. (2014, April). Quantitative tabletop coherent diffraction imaging microscope for EUV lithography mask inspection. In *SPIE Advanced Lithography* (pp. 90501D-90501D). International Society for Optics and Photonics. DOI 10.1117/12.2046526

Ref 6: Fürhapter, S., Jesacher, A., Bernet, S., & Ritsch-Marte, M. (2005). Spiral phase contrast imaging in microscopy. *Optics Express*, 13(3), 689-694. DOI: 10.1364/OPEX.13.000689

Ref 7: Adlyte (Switzerland) http://www.adlyte.com/

Ref 8: *Lens Design Fundamentals* by Rudolf Kingslake, 1978, page 321-322.

Ref. 9: Wikipedia, https://en.wikipedia.org/wiki/Etendue

Ref. 10: Wintz, D. T., Goldberg, K. A., Mochi, I., & Huh, S. (2010, March). Photon flux requirements for EUV reticle imaging microscopy in the 22- and 16 nm nodes. In *SPIE Advanced Lithography* (pp. 76362L-76362L). International Society for Optics and Photonics. DOI 10.1117/12.846528

What is claimed is:

1. A spot-scanning microscope comprising illumination optics, collection optics, an array of optical detectors, and a scanning mechanism, wherein:
   the illumination optics focus each of a plurality of discrete radiation beams onto a corresponding focal spot on or proximate an inspection surface,
   the radiation beams transmit through, or reflect from, the inspection surface, and are conveyed by the collection optics to the detector array, whereby each detector senses optical radiation from a corresponding radiation beam, each radiation beam has an angular radiance distribution after transmitting through or reflecting from the inspection sample, each detector comprises a plurality of optical sensor elements, which sense different portions of the corresponding radiation beam's angular radiance distribution, the scanning mechanism establishes relative motion between the focal spots and the inspection surface so that the paths traversed by the focal spots relative to the inspection surface comprise a set of scan lines on the surface, and the detectors sense the radiation in synchronization with the scan motion to synthesize a high-resolution raster image of the inspection surface, or to optically measure characteristics of the inspection surface.

2. The spot-scanning microscope of claim 1 further comprising a radiation source and spot-generation optics, wherein the spot-generation optics partition radiation from the radiation source into the discrete radiation beams.

3. The spot-scanning microscope of claim 2 wherein the spot-generation optics comprise microlenses, and each radiation beam traverses and is formed by a corresponding microlens.

4. The spot-scanning microscope of claim 3 wherein the microlenses are configured to neutralize geometric aberrations of the collection optics at the focal spots.

5. The spot-scanning microscope of claim 3 wherein the microlenses are achromatic Schupmann doublets.

6. The spot-scanning microscope of claim 5 wherein the radiation source is a laser-produced plasma, and the Schupmann doublets comprise phase-Fresnel lens elements.

7. The spot-scanning microscope of claim 6 wherein the radiation is 13.5-nm EUV radiation.

* * * * *